United States Patent
Kwon

(10) Patent No.: US 7,620,677 B2
(45) Date of Patent: Nov. 17, 2009

(54) 4:2 CARRY SAVE ADDER AND 4:2 CARRY SAVE ADDING METHOD

(75) Inventor: Yo-han Kwon, Gunpo-si (KR)

(73) Assignee: Samsung Electronics Co., Ltd. (KR)

( * ) Notice: Subject to any disclaimer, the term of this patent is extended or adjusted under 35 U.S.C. 154(b) by 781 days.

(21) Appl. No.: 11/032,368

(22) Filed: Jan. 10, 2005

(65) Prior Publication Data

US 2005/0165878 A1 Jul. 28, 2005

(30) Foreign Application Priority Data

Jan. 28, 2004 (KR) .................. 10-2004-0005310

(51) Int. Cl.
*G06F 7/50* (2006.01)
(52) U.S. Cl. .................. 708/708; 708/620; 708/709
(58) Field of Classification Search .............. 708/708, 708/620, 670–714
See application file for complete search history.

(56) References Cited

U.S. PATENT DOCUMENTS

| 5,491,653 | A |   | 2/1996 | Taborn et al. ............... 364/784 |
| 5,805,491 | A | * | 9/1998 | Bechade ..................... 708/708 |
| 5,818,747 | A | * | 10/1998 | Wong ......................... 708/702 |
| 7,284,029 | B2 | * | 10/2007 | Belluomini et al. ......... 708/708 |
| 2003/0145032 | A1 | * | 7/2003 | Bradley et al. .............. 708/708 |

FOREIGN PATENT DOCUMENTS

| JP | 2000-235477 | 8/2000 |
| KR | 97-22732 | 5/1997 |

* cited by examiner

*Primary Examiner*—Lewis A Bullock, Jr.
*Assistant Examiner*—Michael Yaary
(74) *Attorney, Agent, or Firm*—Mills & Onello, LLP.

(57) ABSTRACT

Provided are a simplified 4:2 carry save adder (CSA) cell and a 4:2 carry save adding method. The 4:2 CSA cell is formed of an odd detector and first through sixth switches through logic optimization. The odd detector generates an XOR of the first through fourth input signals, outputs the XOR as an odd signal, generates an XOR of the first and second input signals, and outputs the XOR as a first XOR signal. The first switch outputs the third input signal as a carry output signal in response to the first XOR signal. The second switch outputs the first input signal as the carry output signal in response to an inverted first XOR signal. The third switch outputs the carry input signal as a carry signal in response to the odd signal. The fourth switch outputs the fourth input signal as the carry signal in response to an inverted odd signal. The fifth switch outputs an inverted carry input signal as a sum signal in response to the odd signal. The sixth switch outputs the carry input signal as the sum signal in response to the inverted odd signal.

2 Claims, 3 Drawing Sheets

4:2 CARRY SAVE ADDER AND 4:2 CARRY SAVE ADDING METHOD

BACKGROUND OF THE INVENTION

This application claims the benefit of Korean Patent Application No. 2004-5310, filed on Jan. 28, 2004, in the Korean Intellectual Property Office, the contents of which are incorporated herein in their entirety by reference.

1. Field of the Invention

The present invention relates to a digital multiplier, and more particularly, to a simplified 4:2 carry save adder (hereinafter, referred to as a CSA) and a 4:2 carry save adding method.

2. Description of the Related Art

Operation of digital computers typically includes efficient algorithms for using complicated logic circuits and other hardware. Numbers used in a digital computer are expressed in strings composed of 0s or 1s, and the computer hardware performs simple and basic Boolean operations on the binary number strings. All arithmetic operations are performed based on a hierarchical arithmetic operation, which typically requires that the arithmetic operation start with the simplest operation. The performance of a digital computer depends on a computer operation performed according to a specific computation method or a specific algorithm.

Multiplication is the most commonly executed arithmetic operation in current computer systems. High-speed multiplication is essential. Fast multiplication can be achieved using a Booth algorithm which reduces the total number of partial products by modifying a multiplier. Alternatively, fast multiplication can be achieved using a multiplier based on a Wallace tree which adds partial products according to its tree shape and gradually reduces the total number of partial products.

FIG. 1 illustrates a 32×32 multiplier based on a Wallace tree structure. Referring to FIG. 1, 16 partial products PP0 to PP15 produced using a 4 radix Booth decoding method are provided to CSAs. As illustrated in FIG. 1, 14 CSA cells arranged in 6 stages are required to add 16 partial products PP0 to PP15. Each of the CSA cells is composed of 3:2 CSA cells and receives three partial products (e.g., PP1 through PP3) and outputs two outputs, which are a sum SUM and a carry CRY.

In this Wallace tree-based multiplier, each of the CSA cells needs a computation space where 32 to 64 bits are to be processed. Hence, when the multiplier is implemented in hardware, it occupies a large silicon area. Since a sum calculation is slower than a carry computation until a final CSA level, a glitch occurs as the calculations proceed, thus decreasing the speeds of the calculations.

4:2 CSA cells instead of the 3:2 CSA cells may be used to increase the speed of a computation executed in the Wallace tree-based multiplier of FIG. 1. FIG. 2 illustrates a conventional 4:2 CSA cell which has four inputs A, B, C, and D and two outputs SUM and CRY and is composed of two 3:2 CSA cells 201 and 202. The 3:2 CSA cell 201 calculates a sum SUM of and a carry CRY of the three inputs A, B, and C and is shown in greater detail in FIG. 3. The 3:2 CAS cell includes two XOR gates 301 and 302 and four NAND gates 303, 304, 305, and 306. The sum SUM is obtained by the XOR gate 302 performing an exclusive OR (XOR) operation on an XOR of the inputs A and B obtained by XOR gate 301 and the input C. The carry CRY is obtained by NAND gate 306 performing a NAND operation on a NAND of the inputs A and B obtained by NAND gate 303, a NAND of the inputs B and C obtained by NAND gate 304, and a NAND of the inputs A and C obtained by NAND gate 305.

Because the conventional 4:2 CAS cell is composed of two 3:2 CSA cells as described above, it needs twice the number of logic gates required by a 3:2 CAS cell. That is, the conventional 4:2 CAS cell includes 4 XOR gates and 8 NAND gates. Transistors that form the gates of the conventional 4:2 CAS cell cause the same problem that the Wallace tree-based multiplier of FIG. 1 occupies a large silicon area.

Hence, there is a demand for a new 4:2 CSA cell capable of minimizing power consumption by decreasing the logic depth through logic optimization.

SUMMARY OF THE INVENTION

The present invention provides an improved and simplified 4:2 CSA cell and a 4:2 carry save adding method.

According to an aspect of the present invention, there is provided a 4:2 carry save adder cell including an odd detector and first through sixth switches. The odd detector generates an XOR of first through fourth input signals, outputs the XOR as an odd signal, generates an XOR of the first and second input signals, and outputs the XOR as a first XOR signal. The first switch outputs the third input signal as a carry output signal in response to the first XOR signal. The second switch outputs the first input signal as the carry output signal in response to an inverted first XOR signal. The third switch outputs the carry input signal as a carry signal in response to the odd signal. The fourth switch outputs the fourth input signal as the carry signal in response to an inverted version of the odd signal. The fifth switch outputs an inverted carry input signal as a sum signal in response to the odd signal. The sixth switch outputs the carry input signal as the sum signal in response to the inverted version of the odd signal.

In one embodiment, the odd detector includes: a first XOR gate performing an XOR operation on the first and second input signals to obtain the first XOR signal; a second XOR gate performing an XOR operation on the third and fourth input signals to obtain a second XOR signal; and a third XOR gate performing an XOR operation on the first and second XOR signals to obtain the odd signal.

According to another aspect, the invention provides a 4:2 carry save adding method comprising: obtaining an XOR of first through fourth inputs; obtaining an XOR of the first and second inputs; outputting the first input as a carry output signal in response to an XOR '0' of the first and second inputs; outputting the third input as the carry output signal in response to an XOR '1' of the first and second inputs; outputting the fourth input as a carry signal in response to an XOR '0' of the first through fourth inputs; outputting a carry input signal as the carry signal in response to an XOR '1' of the first through fourth inputs; outputting the carry input signal as a sum signal in response to the XOR '0' of the first through fourth inputs; and outputting an inverted carry input signal as the sum signal in response to the XOR '1' of the first through fourth inputs.

Accordingly, the 4:2 CSA cell is formed of a reduced number of components through logic optimization. Thus, a silicon area occupied by the components of the 4:2 CSA cell is minimized, and power consumption is reduced.

BRIEF DESCRIPTION OF THE DRAWINGS

The foregoing and other features and advantages of the invention will be apparent from the more particular description of an embodiment of the invention, as illustrated in the accompanying drawing. The drawing is not necessarily to scale, emphasis instead being placed upon illustrating the principles of the invention. Like reference characters refer to like elements throughout the drawings.

DETAILED DESCRIPTION OF THE INVENTION

Figure 1:
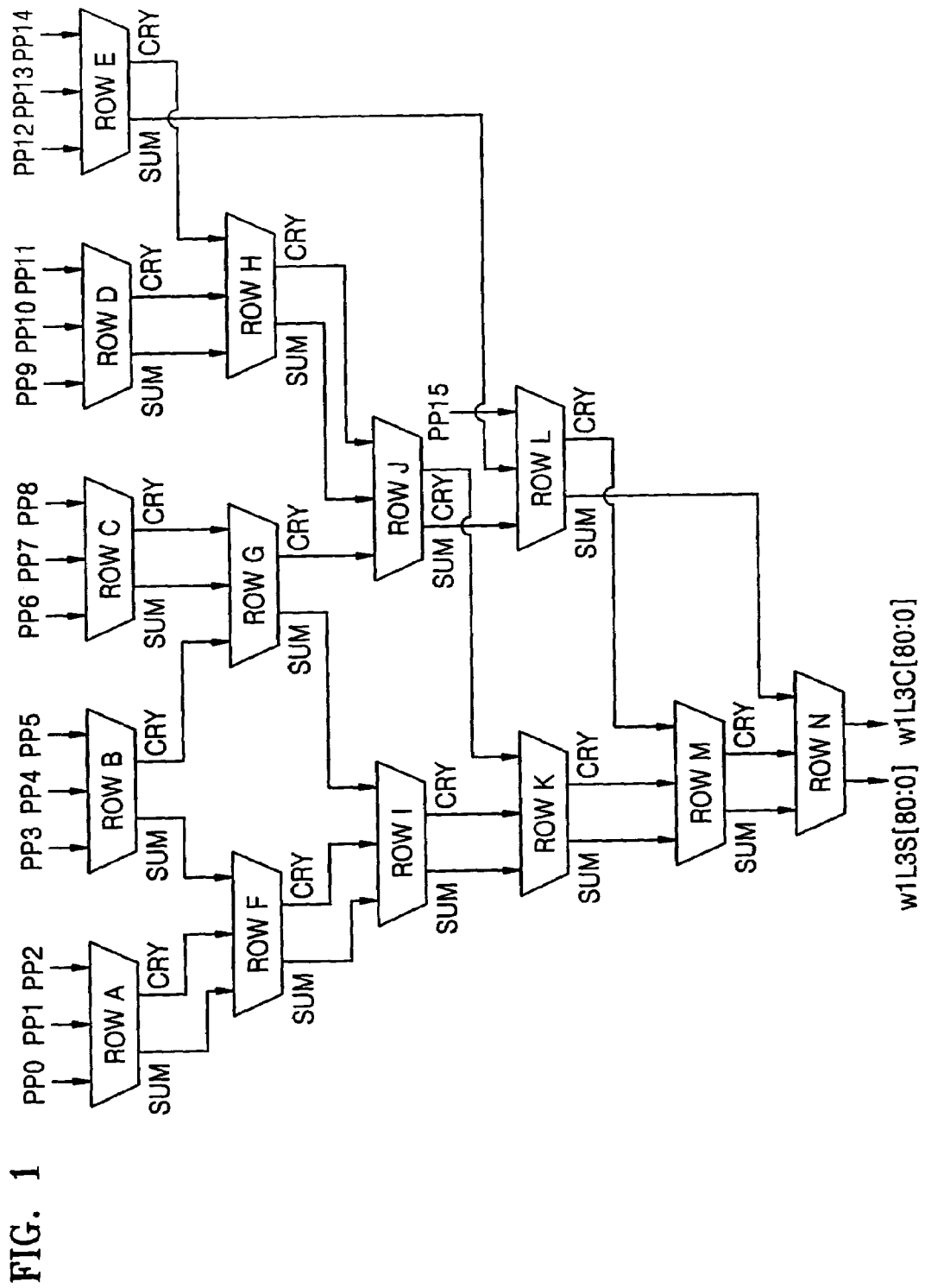
FIG. 1 contains a schematic diagram which illustrates a 32×32 multiplier using a 4 radix booth decoding method.
Figure 2:
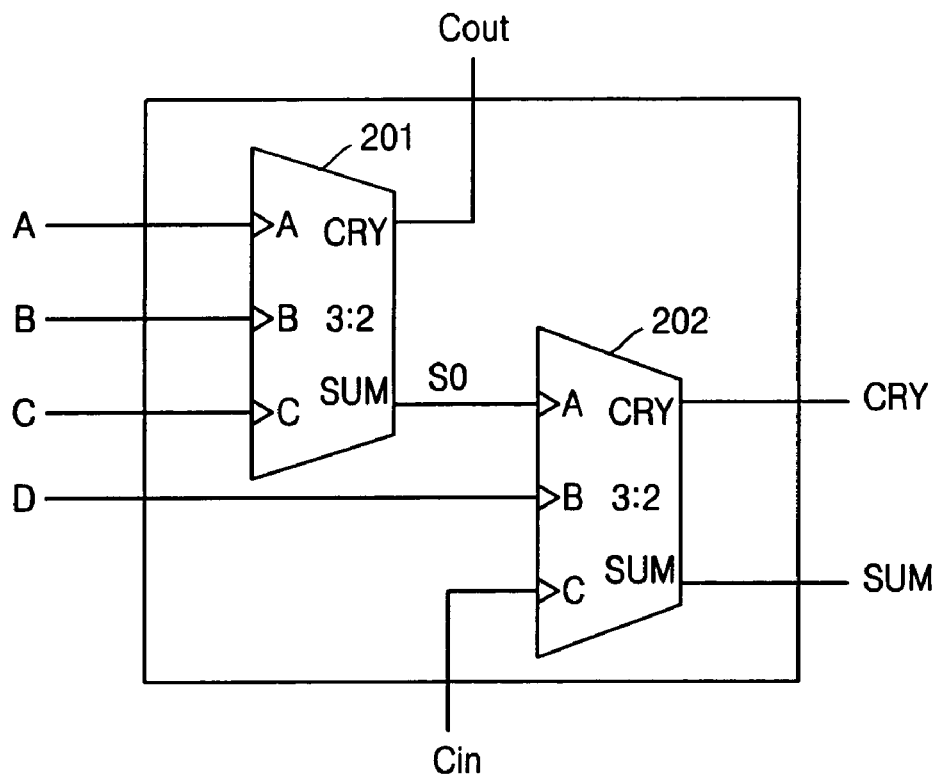
FIG. 2 contains a schematic diagram which a conventional 4:2 carry save adder (CSA) cell.
Figure 3:
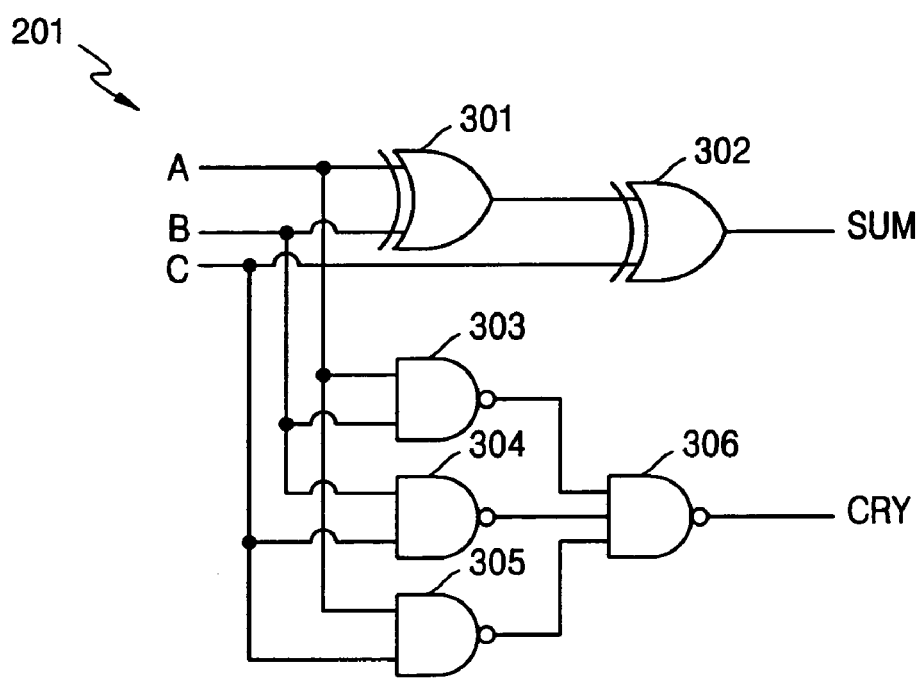
FIG. 3 is a contains a schematic diagram which illustrates a 3:2 CSA cell of FIG. 2.

The operation of the conventional 4:2 CSA cell of FIG. 2 is expressed in the following truth table.

TABLE 1

| | | | | | | Cin = 0 | | Cin = 1 | |
|---|---|---|---|---|---|---|---|---|---|
| A | B | C | D | Cout | S0 | SUM | CRY | SUM | CRY |
| 0 | 0 | 0 | 0 | 0 | 0 | 0 | 0 | 1 | 0 |
| 0 | 0 | 0 | 1 | 0 | 0 | 1 | 0 | 0 | 1 |
| 0 | 0 | 1 | 0 | 0 | 1 | 1 | 0 | 0 | 1 |
| 0 | 0 | 1 | 1 | 0 | 1 | 0 | 1 | 1 | 1 |
| 0 | 1 | 0 | 0 | 0 | 1 | 1 | 0 | 0 | 1 |
| 0 | 1 | 0 | 1 | 0 | 1 | 0 | 1 | 1 | 1 |
| 0 | 1 | 1 | 0 | 1 | 0 | 0 | 0 | 1 | 0 |
| 0 | 1 | 1 | 1 | 1 | 0 | 1 | 0 | 0 | 1 |
| 1 | 0 | 0 | 0 | 0 | 1 | 1 | 0 | 0 | 1 |
| 1 | 0 | 0 | 1 | 0 | 1 | 0 | 1 | 1 | 1 |
| 1 | 0 | 1 | 0 | 1 | 0 | 0 | 0 | 1 | 0 |
| 1 | 0 | 1 | 1 | 1 | 0 | 1 | 0 | 0 | 1 |
| 1 | 1 | 0 | 0 | 1 | 0 | 0 | 0 | 1 | 0 |
| 1 | 1 | 0 | 1 | 1 | 0 | 1 | 0 | 0 | 1 |
| 1 | 1 | 1 | 0 | 1 | 1 | 1 | 0 | 0 | 1 |
| 1 | 1 | 1 | 1 | 1 | 1 | 0 | 1 | 1 | 1 |

Referring to Table 1, a sum S0 of inputs A, B, and C is obtained from an XOR of the inputs A and B, an XOR of inputs C and D, and the input D, and a carry Cout of the inputs A, B, and C is one selected from the inputs A and C depending on the XOR of the inputs A and B and a previous carry Cin. A truth table such as Table 2 is obtained from Table 1.

Referring to Table 2, a sum SUM and a carry CRY are set as a carry input Cin or an input D depending on an XOR (0 or 1) of inputs A, B, C, and D, and a carry output Cout is set as an input A or C depending on an XOR (0 or 1) of the inputs A and B. This can be expressed in Table 3.

TABLE 3

| A^B | A^B^C^D | SUM | CRY | Cout |
|---|---|---|---|---|
| 0 | 0 | Cin | D | A |
| 0 | 1 | !Cin | Cin | A |
| 1 | 0 | Cin | D | C |
| 1 | 1 | !Cin | Cin | C |

Figure 4:
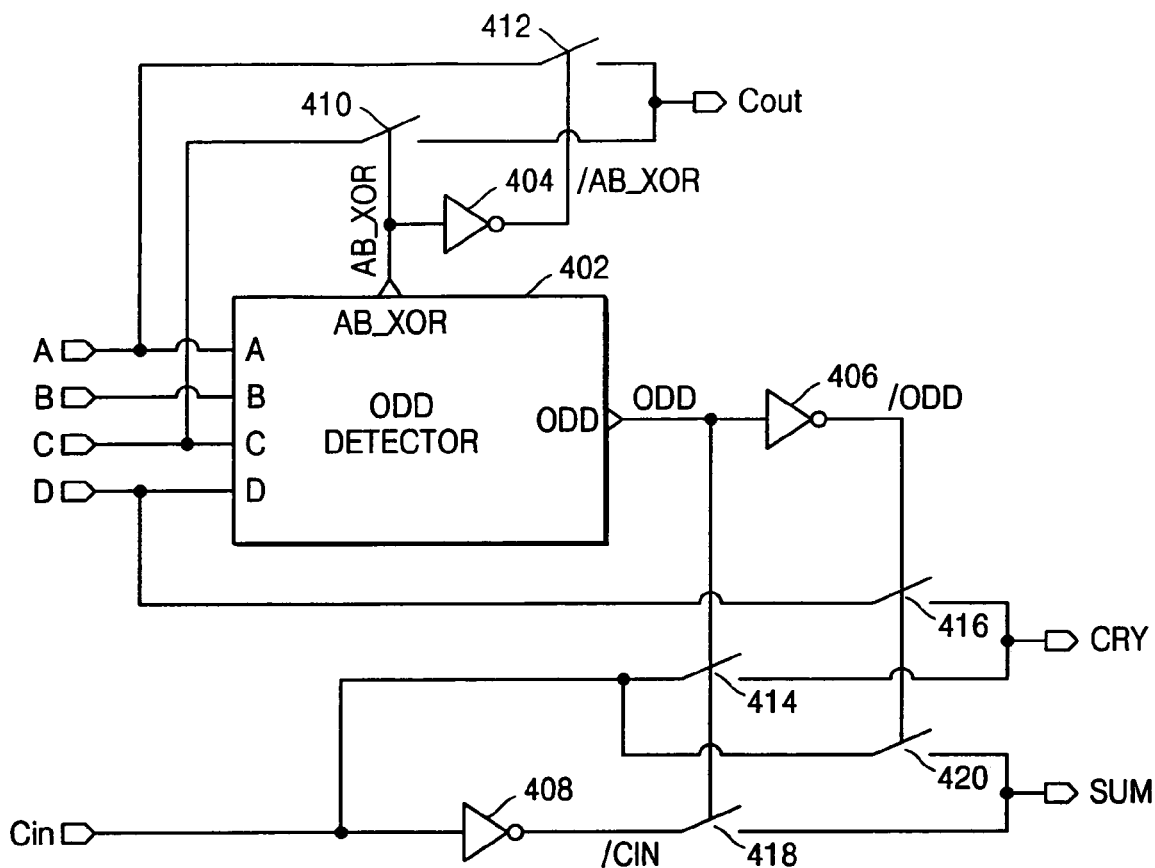
FIG. 4 contains a schematic diagram which illustrates a 4:2 CSA cell according to an embodiment of the present invention.

FIG. 4 shows a logic of a 4:2 CSA implemented according to the final truth table of Table 3. Referring to FIG. 4, the 4:2 CSA includes an ODD detector 402, first through third inverters 404, 406, and 408, and first through sixth switches 410, 412, 414, 416, 418, and 420.

Figure 5:
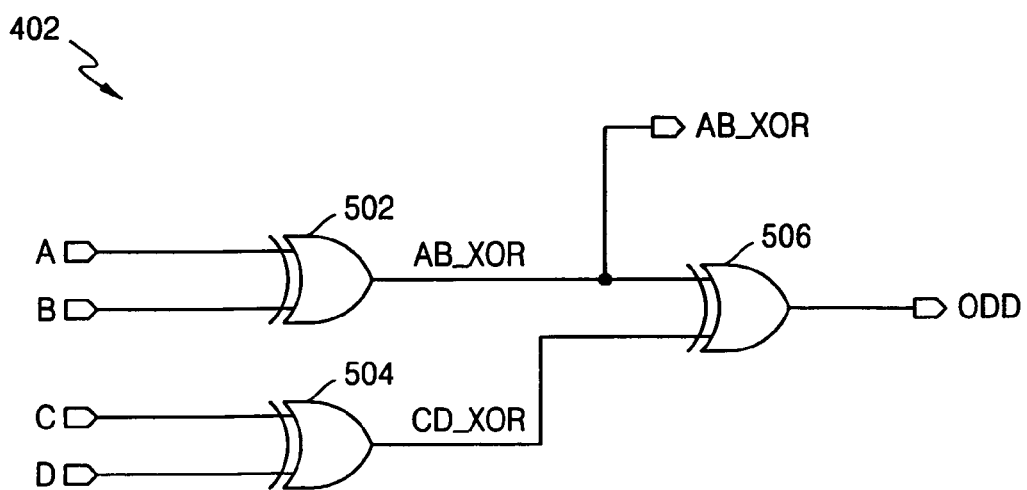
FIG. 5 contains a schematic diagram which illustrates an ODD detector of FIG. 4.

The ODD detector 402 is shown in detail in FIG. 5 and includes first, second, and third gates 502, 504, and 506. The first gate 502 receives inputs A and B and outputs a first XOR signal AB_XOR. The second gate 504 receives inputs C and D and outputs a second XOR signal CD_XOR. The third gate 506 receives the first and second XOR signals AB_XOR and CD_XOR and outputs an odd signal ODD, which denotes an XOR signal of the inputs A, B, C, and D.

Referring back to FIG. 4, the first inverter 404 inverts the first XOR signal AB_XOR, the second inverter 406 inverts the odd signal ODD, and the third inverter 408 inverts a carry input signal Cin.

The first switch 410 outputs the input C as a carry output signal Cout in response to the first XOR signal AB_XOR, and the second switch 412 outputs the input A as the carry output signal Cout in response to an inverted first XOR signal /AB_XOR/

The third switch 414 outputs the carry input signal Cin as a carry CRY in response to the odd signal ODD, and the fourth switch 416 outputs the input D as the carry CRY in response to an inverted odd signal /ODD.

The fifth switch 418 outputs an inverted carry input signal /Cin as a sum SUM in response to the odd signal ODD, and the sixth switch 420 outputs the carry input signal Cin as the sum SUM in response to the inverted odd signal /ODD.

TABLE 2

| | | | | | | Cin = 0 | | Cin = 1 | | | | | | | |
|---|---|---|---|---|---|---|---|---|---|---|---|---|---|---|---|
| A | B | C | D | Cout | S0 | SUM | CRY | SUM | CRY | A^ | C^D | A^B^C | SUM | CRY | Cout |
| 0 | 0 | 0 | 0 | 0 | 0 | 0 | 0 | 1 | 0 | 0 | 0 | 0 | Cin | D | A |
| 0 | 0 | 0 | 1 | 0 | 0 | 1 | 0 | 0 | 1 | 0 | 1 | 1 | !Cin | Cin | A |
| 0 | 0 | 1 | 0 | 0 | 1 | 1 | 0 | 0 | 1 | 0 | 1 | 1 | !Cin | Cin | A |
| 0 | 0 | 1 | 1 | 0 | 1 | 0 | 1 | 1 | 1 | 0 | 0 | 0 | Cin | D | A |
| 0 | 1 | 0 | 0 | 0 | 1 | 1 | 0 | 0 | 1 | 1 | 0 | 1 | !Cin | Cin | C |
| 0 | 1 | 0 | 1 | 0 | 1 | 0 | 1 | 1 | 1 | 1 | 1 | 0 | Cin | D | C |
| 0 | 1 | 1 | 0 | 1 | 0 | 0 | 0 | 1 | 0 | 1 | 1 | 0 | Cin | D | C |
| 0 | 1 | 1 | 1 | 1 | 0 | 1 | 0 | 0 | 1 | 1 | 0 | 1 | !Cin | Cin | C |
| 1 | 0 | 0 | 0 | 0 | 1 | 1 | 0 | 0 | 1 | 1 | 0 | 1 | !Cin | Cin | C |
| 1 | 0 | 0 | 1 | 0 | 1 | 0 | 1 | 1 | 1 | 1 | 1 | 0 | Cin | D | C |
| 1 | 0 | 1 | 0 | 1 | 0 | 0 | 0 | 1 | 0 | 1 | 1 | 0 | Cin | D | C |
| 1 | 0 | 1 | 1 | 1 | 0 | 1 | 0 | 0 | 1 | 1 | 0 | 1 | !Cin | Cin | C |
| 1 | 1 | 0 | 0 | 1 | 0 | 0 | 0 | 1 | 0 | 0 | 0 | 0 | Cin | D | A |
| 1 | 1 | 0 | 1 | 1 | 0 | 1 | 0 | 0 | 1 | 0 | 1 | 1 | !Cin | Cin | A |
| 1 | 1 | 1 | 0 | 1 | 1 | 1 | 0 | 0 | 1 | 0 | 1 | 1 | !Cin | Cin | A |
| 1 | 1 | 1 | 1 | 1 | 1 | 0 | 1 | 1 | 1 | 0 | 0 | 0 | Cin | D | A |

The 4:2 CSA cell composed of 3 XOR gates, 3 inverters, and 6 switches occupies a silicon area smaller than the silicon area occupied by the conventional 4:2 CSA cell of FIG. 2 formed by wiring 4 XOR gates and 8 NAND gates. Due to a decrease in the number of components of the 4:2 CSA cell, power consumption is reduced.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A digital multiplication circuit for adding partial products received by the digital multiplication circuit, the digital multiplication circuit having a 4:2 carry save adder cell comprising:

an odd detector generating an XOR signal of first through fourth input signals, outputting the XOR signal of the first through fourth input signals as an odd signal, generating an XOR signal of the first and second input signals, and outputting the XOR signal of the first and second input signals as a first XOR signal;

a first switch outputting the third input signal as a carry output signal in response to the first XOR signal of a logic '1' state;

a second switch outputting the first input signal as the carry output signal in response to a first XOR signal of a logic '0' state;

a third switch outputting the carry input signal as a carry signal in response to the odd signal;

a fourth switch outputting the fourth input signal as the carry signal in response to an inverted version of the odd signal;

a fifth switch outputting an inverted carry input signal as a sum signal in response to the odd signal; and a sixth switch outputting the carry input signal as the sum signal in response to the inverted version of the odd signal.

2. The 4:2 carry save adder cell of claim 1, wherein the odd detector comprises:

a first XOR gate performing an XOR operation on the first and second input signals to obtain the first XOR signal;

a second XOR gate performing an XOR operation on the third and fourth input signals to obtain a second XOR signal; and a third XOR gate performing an XOR operation on the first and second XOR signals to obtain the odd signal.

* * * * *

UNITED STATES PATENT AND TRADEMARK OFFICE
CERTIFICATE OF CORRECTION

PATENT NO.        : 7,620,677 B2
APPLICATION NO.   : 11/032368
DATED             : November 17, 2009
INVENTOR(S)       : Yo-han Kwon It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1348 days.

Signed and Sealed this

Twenty-sixth Day of October, 2010

David J. Kappos
*Director of the United States Patent and Trademark Office*